United States Patent [19]

Snow

[11] 4,312,391
[45] Jan. 26, 1982

[54] ROUTER ADAPTING FIXTURE FOR RADIAL ARM SAWS

[76] Inventor: Thomas D. Snow, 2256 Maxine Way, Rancho Cordova, Calif. 95670

[21] Appl. No.: 871,346

[22] Filed: Jan. 23, 1978

[51] Int. Cl.$^3$ ............................................. B27C 5/10
[52] U.S. Cl. ...................................................... 144/1 F
[58] Field of Search ................... 248/14, 16; 83/471.2, 83/471.3; 408/26; 144/1 R, 35 R, 35 A, 134 R, 134 D, 136 R, 136 D, 1 F

[56] References Cited

U.S. PATENT DOCUMENTS

| | | | |
|---|---|---|---|
| 3,024,817 | 3/1962 | Johnson | 144/35 R X |
| 3,099,298 | 7/1963 | Bellini | 144/1 F |
| 3,179,136 | 4/1965 | Santis | 144/34 R X |
| 3,565,134 | 2/1971 | Toms | 83/471.2 |
| 4,084,629 | 4/1978 | Kreusler | 144/1 F |

Primary Examiner—W. D. Bray

[57] ABSTRACT

The present invention is a router adapting fixture for radial arm saws. The principal object of the invention is to provide a means for mounting a commercially available wood router upon the movable carriage of a radial arm saw such as to combine and unite the adjustment features and capabilities of these two woodworking devices. Movable carriage is defined herein as being that assemblage of parts that move in unison along the radial arm of the saw in normal use. The present invention is comprised of a mounting section and a router mount. Means are provided for affixing the mounting section upon the movable carriage of a radial arm saw, including means for attachment upon the shaft of the radial arm saw motor whereupon tools such as saw blades are normally mounted, and means for attachment to other points upon the movable carriage including those points whereupon a saw blade guard is normally attached, and to the motor housing of said radial arm saw motor, said motor housing comprising an existing structural part of said radial arm saw. Means for mounting and securing a wood router upon the router mount are also provided by the present invention. In using the present invention, the radial arm saw is disconnected from the electrical outlet. Only the wood router is electrically connected. The present invention is neither a woodworking device nor a wood routing device. The present invention is properly an adapting fixture having the function of uniting the capabilities of two existing woodworking devices.

8 Claims, 10 Drawing Figures

ROUTER ADAPTING FIXTURE FOR RADIAL ARM SAWS

REFERENCE

Application Ser. No. 663,520, filed Mar. 3, 1976. Router Adapting Fixture for Radial Arm Saws now abandoned.

The present invention relates to a router adapting fixture for radial arm saws and more particularly to a router adapting fixture embodying means for both lateral and vertical adjustment or positioning, which is independent of any adjustments provided by a radial arm saw or a wood router. Lateral adjustment is hereby defined as parallel to the axis of rotation of the motor shaft of a radial arm saw motor. Vertical adjustment is herein defined as being perpendicular to the axis of rotation of a radial arm saw motor shaft.

The present invention provides means for combining the desirable high routing speed, and the precise depth of adjustment features of a wood router with the accurate horizontal tracking, angular adjustment, and vertical adjustment features of a radial arm saw. The present invention provides means to combine a wood router and radial arm saw such that the utility and usefulness of both these existing tools is enhanced.

In the normal use of wood routers, it is frequently necessary to use great care in avoiding slippage of the router and consequent ruin of expensive pieces of wood. The router base must normally rest directly upon the work and be guided by hand. It is often necessary to make elaborate setups, or to improvise guides of various types. A clear view of the work being done is often impossible. The present invention negates the possibility of slippage by having the router firmly secured upon the router mount and positioned above the work piece. The router is supported and guided by the movable carriage of the radial arm saw. A clearer view of the work being accomplished is possible because the router is positioned above the work, and only the router bit contacts the work piece. Positioning of the work piece is simplified by using the radial arm saw fence. The present invention provides means to quickly and accurately position the router bit to a point or mark on the work piece without moving or reclamping the work being done. Many routing operations such as mortise and tenon work on narrow or short pieces of wood, or repetitive grooving for louvers, or for thin shelving, is quickly accomplished by use of the present invention. The present invention can readily be used with either piloted or non-piloted router bits. Normally, when edging or beading of narrow strips of wood is required, it is customary to accomplish this work on a wide piece of wood and then to remove the strip by ripsawing. This is made unnecessary by use of the present invention since the router is supported and guided by the accurate tracking mechanism of the radial arm saw, and very narrow strips may be readily edged. Many other routing operations are made more simple by using the present invention.

The present invention is simple and rugged in construction. It has no rotating or fast moving parts which are subject to wear and which require close tolerances and expensive machining operations. Other devices which provide some of the capabilities of the present invention are comparatively costly to manufacture due to the necessity for providing such features as a large base or work table, a tracking mechanism having rollers or bearings, tracks or guides, and often complicated adjustment mechanisms. The present invention utilizes these features which already exist in a radial arm saw and a wood router. The present invention may be largely fabricated from existing metal shapes to reduce cost of manufacture. Installation, or mounting of the present invention upon a radial arm saw is simple and requires only removal of the saw blade guard and installing the mounting section upon the shaft of the saw motor and securing at one or two additional points. These other points depend on the manufacture of the radial arm saw. The radial arm saw is disconnected from the electrical outlet. Only the wood router is electrically connected. The radial arm saw serves merely to support and guide the mounted router. Alignment and leveling of the router is quite simple once the radial arm saw has been properly adjusted.

The principal object of the present invention is to provide means for mounting, supporting and guiding a commercial wood router upon the movable carriage of a radial arm saw such as to combine the precise adjustment and accurate horizontal tracking features of a radial arm saw with the precise adjustment features and high routing speed of a wood router.

Another object of the present invention is to provide a router adapting fixture for radial arm saws embodying means for lateral adjustment, which adjustment is independent of any radial arm saw adjustment. This feature allows precise positioning of the router bit without movement of the work piece.

A further object of the present invention is to provide a router adapting fixture for radial arm saws embodying means for both lateral and vertical adjustment or positioning of the mounted router, said vertical adjustment being perpendicular to the axis of rotation of a radial arm saw motor shaft, said adjustment and positioning being independent of any radial arm saw adjustment feature or to router adjustment features. The vertical adjustment or positioning feature allows work to be accomplished on relatively wide wood pieces where work is to be done on the edge of such pieces.

A still further object of the present invention is to provide a router adapting fixture for radial arm saws of the character having a single support guide of non-circular cross section and having both vertical and lateral adjustment features. Such configuration would reduce cost of manufacture in some instances.

An additional object in another alternate embodiment of the present invention is to provide a router adapting fixture for radial arm saws of the character having the base section of the router mount replaced by a cup, or ring for supporting the router and having suitable clamping bands for mounting and securing the router. In using this alternate embodiment, the router motor is removed from its base and positioned upon the router mount. The clamping bands are then made tight to hold the router securely. This alternate embodiment would provide greater flexibility for accomplishing some router operations such as where angular work is required.

An additional object in another alternate embodiment of the present invention is to provide a router adapting fixture for radial arm saws of the character having a simplified construction and having no provision for lateral adjustment or positioning. Such construction would provide a router adapting fixture which could be produced at lower cost.

Other objects and advantages of the present invention will become better understood hereinafter from consideration of the specification with reference to the accompanying drawings forming part thereof, and to which the numerals correspond to the parts throughout the several views of the invention and wherein.

Figure 5A:
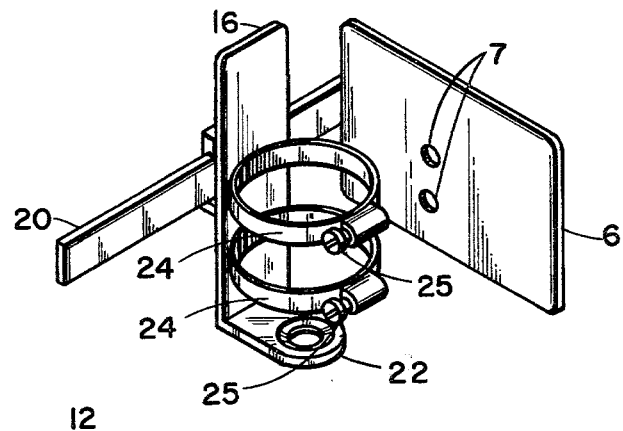

FIG. 5A is a perspective view of an alternate embodiment of the present invention, showing a single simplified support guide of non-circular cross section and an alternate configuration of the router mount wherein the base plate is replaced by a cup or ring for router support, and having circular or annular clamping bands for securing the router motor, which is removed from the router base for mounting in this particular case.

Figure 5:
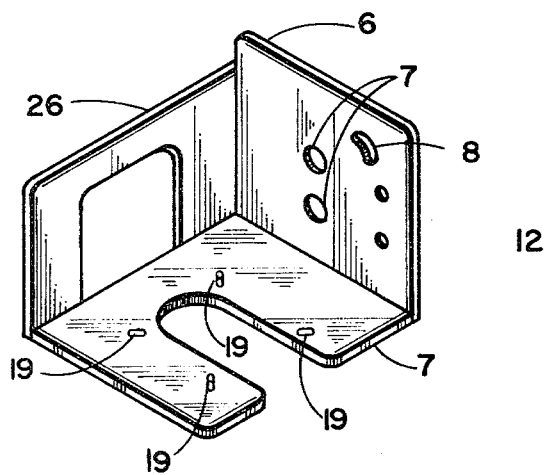

FIG. 5 is a perspective view of an additional alternate embodiment of the present invention, having a simplified construction with no provision for lateral adjustment. Means for vertical positioning is provided in this alternate embodiment.

Figure 6:
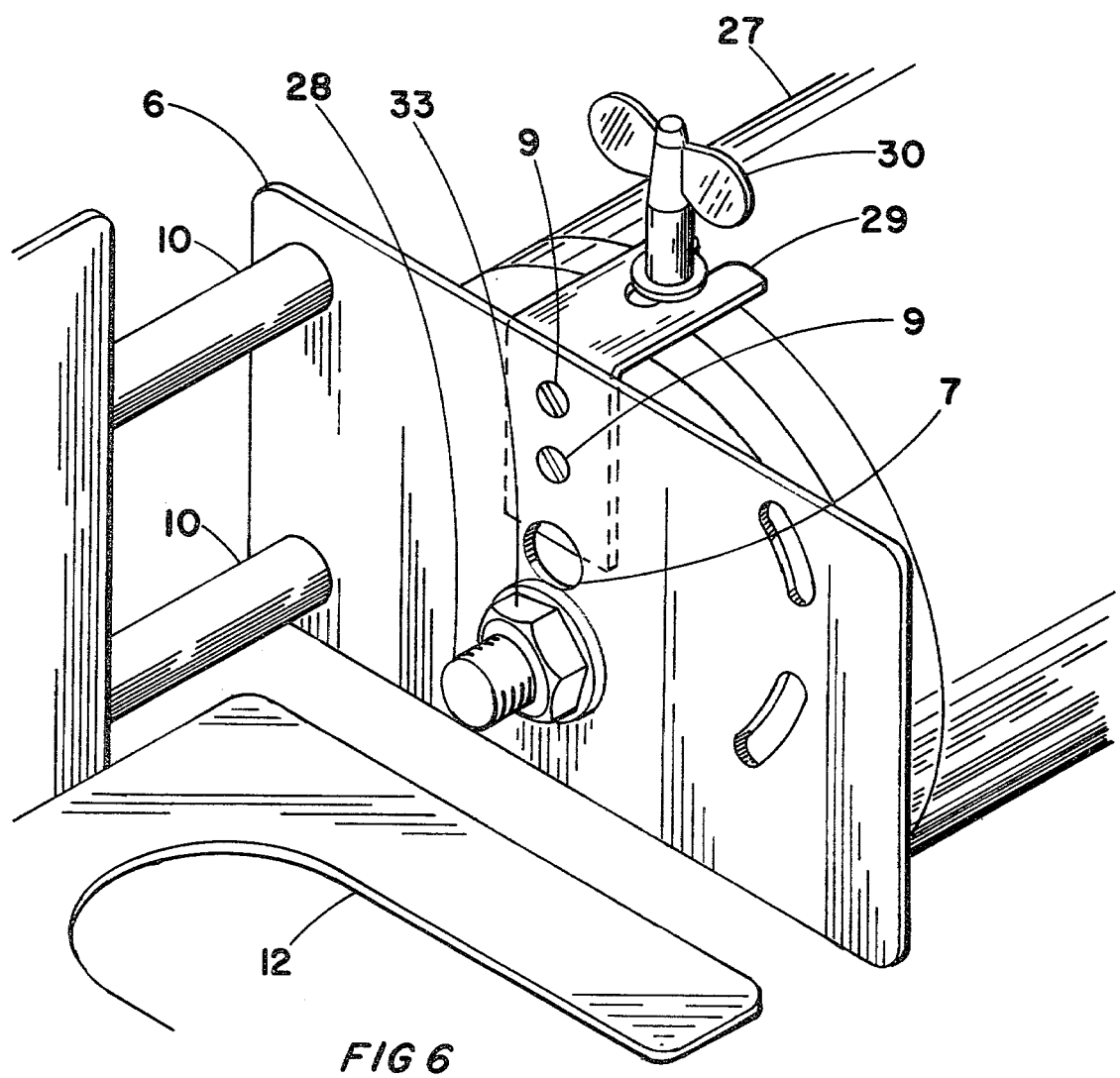

FIG. 6 is a perspective view showing the router adapting fixture mounted upon a radial arm saw, and showing a typical means for attachment upon the movable carriage of a radial arm saw, including attachment upon the radial arm saw motor shaft, and attachment to an additional point upon the saw motor housing.

Figure 7:
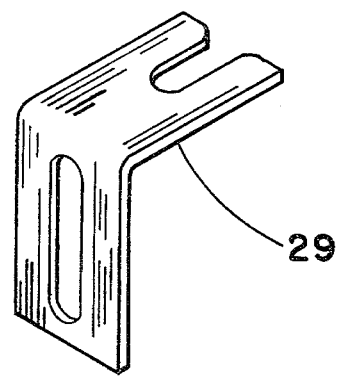

FIG. 7 is a perspective view of the mounting bracket 31 which provides an adjustable means for attaching the router adapting fixture to a point upon the radial arm saw motor housing.

Figure 9:
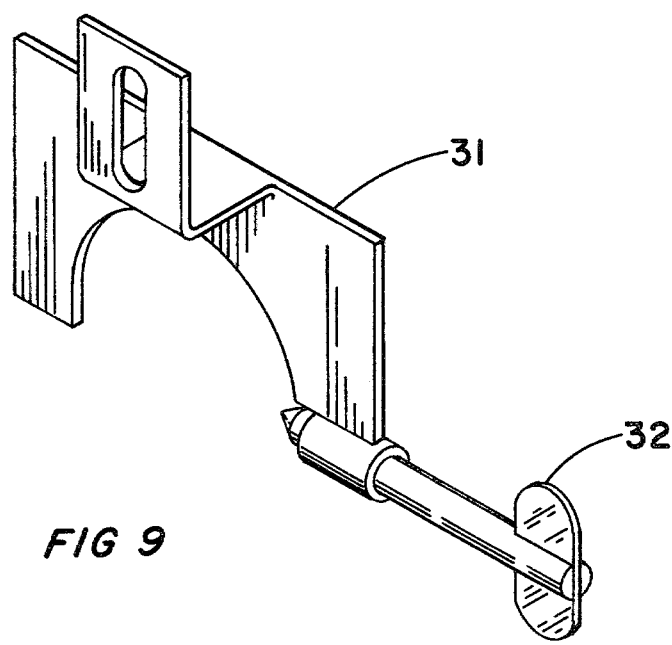
Figure 8:
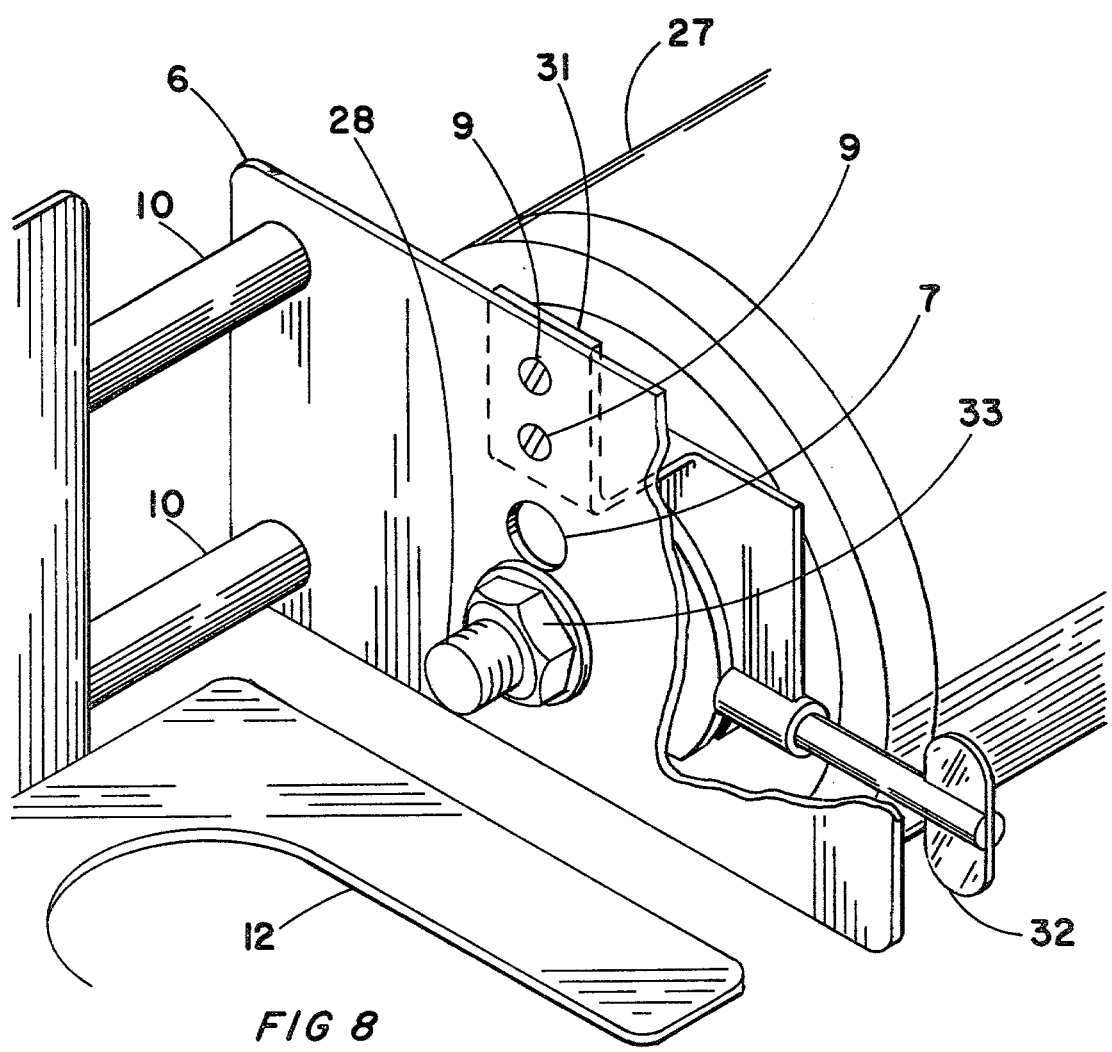

FIG. 8 is a perspective view showing the router adapting fixture mounted upon a radial arm saw, and showing a typical means for attachment upon the movable carriage of a radial arm saw, including attachment upon the radial arm saw motor shaft, and attachment to an additional point upon the radial arm saw motor housing, and FIG. 9 is a perspective view of the sliding bracket which provides an adjustable means for attaching the router adapting fixture to a point upon the radial arm saw motor housing.

Figure 1:
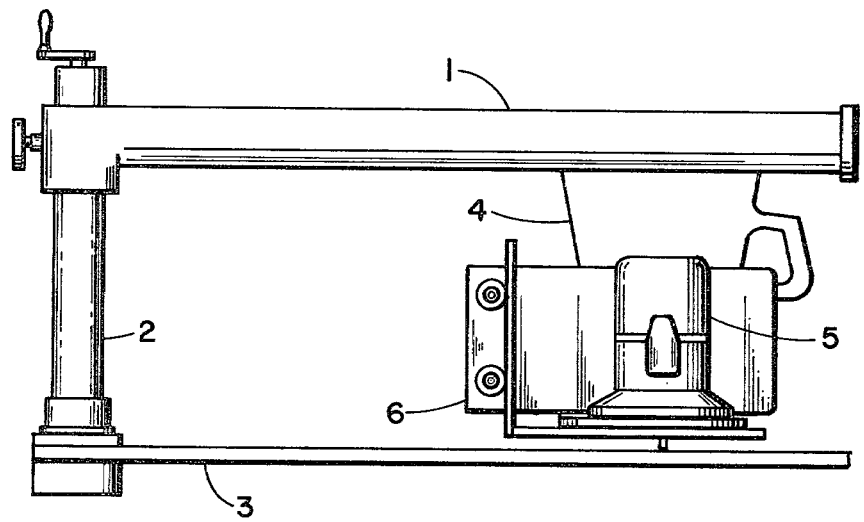
FIG. 1 is a side elevation view of a radial arm saw, showing the movable carriage upon the saw radial arm and having the present invention mounted upon the movable carriage and affixed upon the shaft of the saw motor. A wood router is shown mounted upon the router mount.
Figure 2:
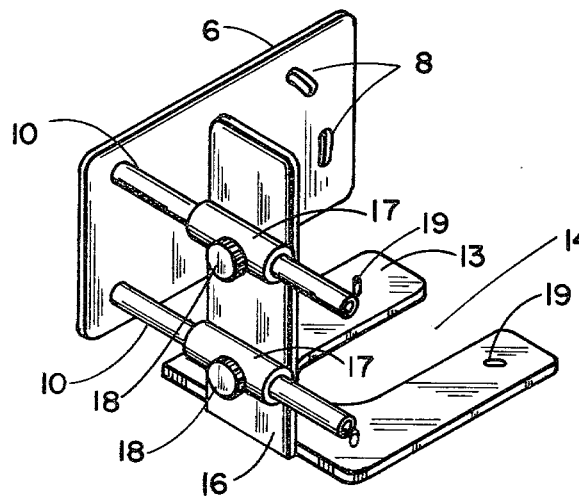
FIG. 2 is a perspective view of the router adapting fixture showing the rear of the router mount, and the clamping screws and guide sleeves used for lateral positioning of the router mount along the support guides.
Figure 3:
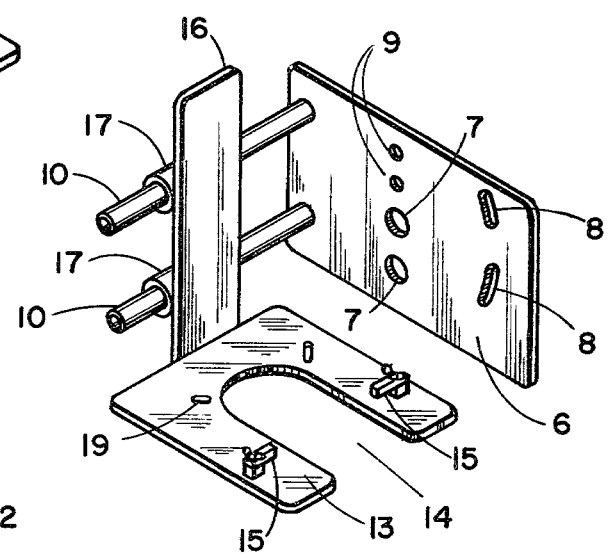
FIG. 3 is a perspective view of the present invention showing the front of the router mount, the aperture through which the router bit extends, and the base plate upon which two of the adjustable clamps used to secure the router base to the base plate are shown.

With reference to the accompanying drawings, a radial arm saw is shown in FIG. 1 and includes the radial arm 1, the standard 2, the work table 3, movable carriage 4, and a mounted wood router 5. The mounting section 6 is shown attached to the shaft of the saw motor and at other points upon the movable carriage 4 of the saw. The present invention comprises two basic parts. The mounting section 6 consists of a flat plate of a suitable thickness to provide the necessary rigidity and is provided with one or more apertures 7, which are centrally located upon the normally horizontal dimension of the mounting section 6, and which fit upon the shaft of the saw motor to provide the major mounting point for the mounting section 6. Additional apertures 8 and 9 are provided in the mounting section 6. The arrangement and positioning of these additional apertures 8 and 9 is varied as is shown in the drawings due to the fact that different makes of radial arm saws require some differences in the mounting arrangements. One or more support guides 10, having circular or non-circular cross section, extend perpendicularly from the flat frontal surface of the mounting section 6, and provide means for fitting the detachable router mount 12 to the mounting section 6. The detachable router mount 12 is comprised of a base plate 13 of a suitable thickness to provide the necessary rigidity and has a centrally located aperture 14 through which the router bit extends downward when a router is mounted thereon. Adjustable clamps 15 are affixed to the base plate 13 providing means for securing a router upon the base plate 13. Two of the clamps 15 are shown affixed to the base plate 13 (FIG. 3) of the drawings. Clamping arrangements vary slightly for different makes of routers due to difference in thickness and diameter of their respective bases. The vertical section 16 is attached to one edge of the base plate 13 and extends perpendicularly thereto. One or more guide sleeves 17 of hollow or annular cross section are affixed to vertical section 16 and fit upon the support guides 10 providing means in conjunction with the support guides 10 for lateral adjustment and support of the detachable router mount 12. Clamp screws 18 are provided for each guide sleeve 17 and provide means for engaging the detachable router mount 12 at any point along the support guides 10. The router adapting fixture for radial arm saws is attached to the movable carriage of a radial arm saw by removing the saw blade guard and the saw blade. The mounting section 6 is then positioned upon the shaft of the saw motor by selecting one of the apertures 7. The washer, and retaining nut for the motor shaft are then replaced and securely tightened. The router mount 12 is aligned parallel with the saw work table 3 by either lowering the router mount 12 to rest the lower surface of the base plate 13 upon the surface of the work table 3, or by using a try square against one vertical edge of the router mount 12. The mounting section 6 is then further secured by attaching at points whereupon the saw blade guard is normally mounted, and by attachment to the radial arm saw motor housing. Suitable slots, holes, adjustable brackets and the like are provided to allow attachment at additional points on saws of different manufacture. The router is positioned upon the base plate 13 of the router mount 12. The router is secured to the base plate 13 using the adjustable clamps 15. Slotted apertures 19 are shown in the base plate 13 (FIG. 1 and FIG. 2). These apertures allow adjustment for accommodating routers with bases of varying diameter. After mounting the router upon the base plate 13, the router is raised using the radial arm saw vertical adjustment feature. The work piece is then clamped upon the saw work table 3 using the saw fence as a guide for positioning the work piece. The router may then be lowered to the work by again using the saw vertical adjustment feature. The router is connected to the electrical outlet, and depending upon the work to be accomplished, final adjustment may be made by use of the router depth adjustment feature and may be accomplished after switching on the router motor for such operations as mortise and tenon work. The router bit is positioned by using the lateral adjustment feature for edging operations such as beading or decorative edging, the router bit being first adjusted for depth, and then moved clear of the work before switching on the router motor. Routing operations can also be accomplished by moving the work piece. In this case the router is held fixed by locking the saw movable carriage and clamping the lateral adjustment clamp screws 18. The work piece may then be moved to accomplish the desired router operations. This arrangement is useful for certain router operations such as inlay work. The radial arm saw is not electrically connected when using the router adapting fixture.

Figure 4:
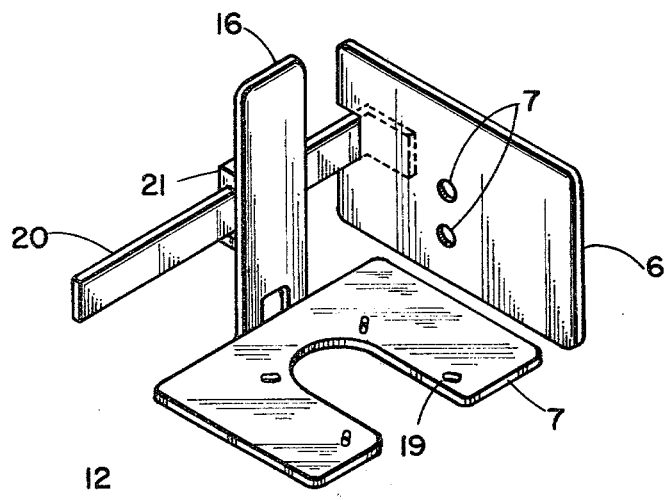
FIG. 4 is a perspective view of an alternate embodiment of the invention showing a single simplified support guide of non-circular cross section.

In the alternate embodiment shown in FIG. 4, the invention comprises a router adapting fixture for radial arm saws having a single non-circular support guide 20 and a guide sleeve 21 of a non-circular cross section.

In the alternate embodiment shown in FIG. 5 the invention comprises a router adapting fixture for radial arm saws having a single non-circular support guide 20 and a non-circular guide sleeve 21. This alternate embodiment has a modified router mount 22 having a circular ring or cup for router support and has circular clamping bands 24 for securing a router motor upon the circular ring. Adjusting screws 25 for the clamping bands 24 are shown in this view.

In the alternate embodiment shown in FIG. 6, the invention comprises a router adapting fixture for radial arm saws which is of simplified construction and has no lateral adjustment provisions. The support guides are replaced by a flat fixed plate 26, having an aperture for weight reduction purposes.

FIG. 6 is a perspective view showing the mounting section 6 mounted upon a radial arm saw from which the saw blade guard has been removed, and having one of the apertures 7 in the mounting section fitted upon the motor shaft of a radial arm saw motor, and secured thereon by means of the shaft nut 33. The mounting section 6 is shown further secured upon the radial arm saw at one additional point upon the radial arm saw motor housing 27 by means of the mounting bracket 31, which is secured to the mounting section through the bracket apertures 9, and to the saw motor housing by means of a stud upon the upper surface of the saw motor housing whereupon a saw blade guard is normally attached to the saw motor, said mounting bracket being secured to said stud by means of the bracket screw 30. The arrangement shown in FIG. 6 for securing the mounting section upon a radial arm saw is typical for radial arm saws having the saw blade guard attached to the saw by means of a stud upon the upper surface of the saw motor housing.

FIG. 7 is a perspective view of the mounting bracket 29 showing the slotted aperture which provides means for vertical adjustment and positioning, and showing the open-ended aperture which fits over a stud upon the upper surface of the saw motor housing whereupon a saw blade guard is normally attached to said radial arm saw motor.

FIG. 8 is a perspective view showing the mounting section 6 mounted upon a radial arm saw from which the saw blade guard has been removed, and having one of the apertures 7 fitted upon the motor shaft of the radial arm saw, and secured thereon by means of the shaft nut 33. The mounting section 6 is further secured to the radial arm saw motor housing by means of the sliding bracket 31. The sliding bracket 31 being secured to the mounting section 6 by attachment through the bracket apertures 9, and further secured to the radial arm saw motor housing by means of the clamping thumb screw 32. The arrangement shown in FIG. 7 for securing the mounting section 6 upon a radial arm saw is typical for radial arm saws having the saw blade guard attached to the grooved end bell of the saw motor housing.

FIG. 9 is a perspective view of the sliding bracket 31 showing the slotted aperture which provides means for adjustment and vertical positioning and the semicircular open-sided aperture which fits over the grooved end bell whereupon a saw blade guard is normally attached, and showing also the clamping thumbscrew 32 which provides means for securing the sliding bracket 31 to the grooved end bell of the radial arm saw motor housing.

Having thus described the invention, it is to be understood that certain modifications in the construction and arrangement of parts thereof will be made as deemed necessary without departing from the scope of the appended claims.

Petitioner claims:

1. A router adapting fixture for radial arm saws, said radial arm saw including a motor having a housing and a shaft extending through an end bell of said housing as part thereof, said shaft connected to said motor and normally mounting a circular saw, said router adapting fixture comprising (a) means for mounting and attaching said router adapting fixture upon the shaft of said radial arm saw motor and means for attaching and securing said router adapting fixture to said motor housing of said radial arm saw motor, (b) means positioned on and perpendicularly of the shaft of said radial arm saw motor, said last named means supporting (c) means adapted to mount a router for lateral adjustment in a plane parallel to the axis of rotation of said radial arm saw motor shaft, (d) means for mounting and securing said router including means to receive the router bit of said router when said router is mounted on said fixture.

2. A router adapting fixture for radial arm saws as defined in claim 1 wherein said means for mounting and securing said router adapting fixture upon said shaft of said radial arm saw motor is comprised of a mounting section of a basically flat plate configuration having a plurality of spaced apart, suitably sized apertures configured to receive said shaft of said radial arm saw motor, said mounting section secured to motor shaft of said radial arm saw motor by a threaded nut affixed to said motor shaft, and said plurality of apertures comprising means for adjustment of said mounting section perpendicularly of the axis of rotation of said radial arm saw motor shaft by varying the aperture chosen to receive said shaft of said radial arm saw motor.

3. A router adapting fixture for radial arm saws as defined in claim 1 wherein said radial arm saw motor housing has a raised centrally located boss on said end bell of said housing, said radial arm saw motor shaft extending normally through said boss, and wherein said means for attachng said router adapting fixture to said housing of said radial arm saw motor is comprised of a mounting section of a basically flat plate configuration having affixed thereon a basically semicircular sliding bracket, said sliding bracket having an elongated aperture configured for receiving attaching screws, said attaching screws comprising means for adjustably securing said sliding bracket to said mounting section, and wherein said sliding bracket means has a threaded thumbscrew attached thereon, said threaded thumbscrew together with said sliding bracket comprising means for attaching said router adapting fixture to said raised boss on said radial arm saw motor end bell.

4. A router adapting fixture for radial arm saws as defined in claim 1 wherein said radial arm saw motor housing has a threaded stud bolt normally affixed to said housing, said threaded stud bolt commonly used to affix a saw blade guard to said radial arm saw motor housing, and wherein said means for attaching said router adapting fixture to said radial arm saw motor housing is comprised of a mounting section of a basically flat plate configuration having affixed thereon a basically L shaped slotted mounting bracket, said mounting bracket and said mounting section together cooperatively comprising means for attaching said router adapting fixture to said threaded stud bolt normally affixed to said radial arm saw motor housing.

5. A router adapting fixture for radial arm saws as defined in claim 1 wherein said means adapted to mount a router for lateral adjustment in a plane parallel to the axis of rotation of said radial arm saw motor shaft is comprised of a mounting section of a basically flat plate configuration having a plurality of circular cross section support guides projecting perpendicularly from the flat frontal face thereof, said support guides comprising means for mounting and supporting a detachable router mount, said detachable router mount comprised of a base plate and a vertical section, said vertical section being perpendicularly disposed and affixed along and upon one edge of said base plate, said base plate and said vertical section together forming an L shaped member, and said vertical section having affixed tangentially thereon a plurality of guide sleeves configured to receive said support guides, said guide sleeves having conjoined clamping means thereon for adjustably affixing and securing said detachable router mount at any point along and upon said support guides, and wherein said means for mounting said router upon said router adapting fixture is comprised of said base plate having a plurality of elongated apertures, and having a plurality of adjustable clamping means affixed thereon, said elongated apertures and said adjustable clamping means together cooperatively comprising said means for mounting and securing said router upon said router adapting fixture.

6. The router adapting fixture for radial arm saws as defined in claim 5 wherein said support guide is of a non-circular cross section and said guide sleeve is configured to receive said noncircular cross section support guide.

7. A router adapting fixture for radial arm saws as defined in claim 1 wherein said means for mounting and securing said router upon said router adapting fixture is comprised of a detachable router mount consisting of a basically circular base plate and a vertical section, said vertical section perpendicularly disposed and affixed upon the edge of said base plate, said vertical section and said base plate forming a basically L shaped member, and wherein said vertical section has affixed perpendicularly and tangentially thereon at least one adjustable clamping band, and wherein said basically circular base plate has a centrally located aperture configured to support the chuck end of said router and defining said means for receiving said router bit.

8. A router adapting fixture for radial arm saws, said radial arm saw including a motor having a housing and a shaft extending through an end bell of said housing and having a threaded stud bolt affixed normally to the surface of said housing as parts thereof, said shaft connected to said motor and normally mounting a circular saw, said router adapting fixture comprising means for mounting and attaching said router adapting fixture on said shaft of said radial arm saw motor comprised of a mounting section of a basically flat plate configuration having a plurality of spaced apart, suitably sized apertures configured to receive said shaft of said radial arm saw motor, said mounting section secured to said motor shaft by a threaded nut affixed to said motor shaft, and said plurality of apertures comprising means for adjustment of said mounting section perpendicularly of the axis of rotation of said radial arm saw motor shaft by varying the aperture chosen to receive the shaft of said radial arm saw motor, and wherein said means for attaching said router adapting fixture to said radial arm saw motor housing is comprised of said mounting section having affixed thereon a basically L shaped slotted mounting bracket, said mounting section together with said slotted mounting bracket cooperativly comprising means for attaching said router adapting fixture to said threaded stud bolt normally affixed to said radial arm saw motor housing, and said router adapting fixture having means adapted for mounting and securing a router upon said fixture comprised of a base plate of a basically flat plate configuration, and a vertical section of a basically flat plate configuration, said base plate and said vertical section affixed normally to the flat frontal face of said mounting section forming an enclosed corner encompassing three planes, said base plate having thereon a plurality of elongated apertures in combination with a plurality of adjustable clamping means, which combination of elongated apertures and adjustable clamping means comprise means for mounting and securing said router upon said router adapting fixture.

* * * * *